3,075,882
ESTRONE SOLUBILIZED WITH N,N-
DIMETHYLACETAMIDE
Harry Sponnoble, Kalamazoo Township, Kalamazoo County, and James E. Tingstad, Kalamazoo, Mich., assignors to The Upjohn Company, Kalamazoo, Mich., a corporation of Delaware
No Drawing. Filed Mar. 16, 1960, Ser. No. 15,273
4 Claims. (Cl. 167—74)

This invention relates to a therapeutic composition and more particularly to a therapeutic composition comprising an oleaginous solution of estrone in a fixed oil, solubilized by the presence of N,N-dimethylacetamide.

Estrone containing compositions have been used medicinally for the treatment of a variety of conditions associated with estrogen deficiencies. These conditions include the menopausal syndrome, senile vaginitis, kraurosis vulvae and pruritis vulvae. The estrone has been administered topically, orally and parenterally.

The oral and parenteral compositions were, advantageously, in the form of an oleaginous solution with a fixed oil as the vehicle, the solutions being then sterilized for parenteral administration or enclosed within a gelatin capsule for oral administration. The preparation of these solutions for commercial use, however, has presented difficulties due to the extremely low solubility of estrone in a fixed oil. A specific difficulty encountered was the tendency of the estrone to crystallize out of solution on standing or cooling when the solution was effected by means of heat; the presence of crystals rendering a parenteral composition unfit for use or, in the case of a capsule, the crystals not flowing properly in the machine used for capsule filling. Another difficulty encountered was the slow rate of solution of estrone in oil. Due to the slow rate of solution it was necessary to heat the large production amounts of oil and maintain the elevated temperatures for the length of time necessary for the estrone to be dissolved.

It is therefore an object of the present invention to provide a solution of estrone in fixed oil wherein the concentration of estrone is sufficient to provide a practical, therapeutic, concentration of hormone and which is sufficiently stable to remain in the form of a solution during processing and while in the channels of commerce prior to ultimate use. A further object is to provide a composition that is readily prepared in commercial quantities.

The foregoing and additional objects have been accomplished by the provision of pharmaceutical compositions comprising a stable solution of estrone, N,N-dimethylacetamide, and a fixed oil. Advantageously the solutions can be sterile and placed in a suitable container for parenteral administration or can be enclosed within a gelatin capsule for oral administration.

The amount of estrone, the therapeutic ingredient of the novel compositions, can be varied in its concentration to suit the requirements for any particular use. For example, the concentration of estrone can be on a mg./cc. basis which parallels established therapeutic dosages. A concentration range of from about 0.01 to about 1% (w./v.) is preferred. In addition to the use of estrone in its pure form, it is possible to use estrone in a substantially pure form derived from natural sources. This "crude" estrone consists of naturally occurring estrogens obtained from pregnant mare's urine (although other sources such as human are available) containing 97% estrone with small amounts of equilin, equilenin, and possible traces of estradiol. Such a product is commercially available from the Vitamerican Company and is known as "Estrogenic Crystallizate."

The concentration of N,N-dimethylacetamide can vary with the required concentration of the estrone component, with a range of from about 0.1 to about 10% v./v. being operative. The concentration of N,N-dimethylacetamide parallels the concentration of estrone, i.e., the higher concentration of one matching the higher concentration of the other.

The remainder of the composition is made up of a fixed oil. Fixed oils such as cottonseed oil, coconut oil, corn oil, olive oil, peanut oil, and sesame oil can be used. Parenterally acceptable oils should be chosen for parenteral compositions and orally acceptable oils should be used for the oral compositions.

Additional ingredients can be included for supplementary properties. For example, in parenteral solutions a preservative such as chlorobutanol, benzyl alcohol, methylparaben, and propylparaben and anesthetics such as procaine, tetracaine, and lidocaine can be included. Additional therapeutic agents can be included such as progesterone.

There are two alternative methods of preparing the solutions: the first and preferred method is to dissolve the estrone in the N,N-dimethylacetamide and then proceed with the addition of the other ingredients (if any) and then add the oil; the second method is to dissolve the N,N-dimethylacetamide in the oil and then add the estrone. The solutions so prepared can then be processed in the usual manner for preparing sterile parenteral solutions or machine encapsulation in soft gelatin capsules.

The compositions are useful for the treatment of conditions associated with deficiency of estrogens, such conditions include menopausal syndrome, natural or artificial, senile vaginitis, kraurosis vulvae, and pruritis vulvae. Those compositions which include progesterone are useful for interrupting prolonged or excessive menstrual bleeding caused by ovarian failure, and re-establishing normal menstrual cycles.

The following examples set forth the best mode contemplated by the inventors of carrying out the invention but are not to be construed as limiting.

*Example 1*

One thousand one-piece soft gelatin capsules for oral administration, each containing 1 mg. of estrone, are prepared by dissolving 1 gm. of estrone in 10 cc. of N,N-dimethylacetamide and sufficient corn oil to make 200 cc. of solution. The solution is encapsulated by placing 0.2 cc. of solution between two pieces of soft gelatin and sealing the gelatin to enclose the solution.

The foregoing capsules are useful in the treatment of menopausal symptoms at a dosage of 1 capsule daily.

Following the foregoing procedure capsules are similarly prepared containing estrone in 0.1 mg., 0.2 mg., and 0.4 mg. quantities by substituting 0.1 gm., 0.2 gm., and 0.4 gm. amounts, respectively, of estrone for the 1 gm. amount of the example. The smaller dosage capsules are useful for maintenance therapy of the preceding condition.

*Example 2*

One thousand one-piece soft gelatin capsules for oral administration, each containing 1 mg. of estrone and 10 mg. of progesterone, are prepared by dissolving 1 gm. of estrone and 10 gm. of progesterone in 10 cc. of N,N-dimethylacetamide and sufficient corn oil to make 200 cc. of solution. The solution is encapsulated by placing 0.2 cc. of solution between two pieces of soft gelatin and sealing the gelatin to enclose the solution.

The foregoing capsules are useful in the treatment of functional bleeding at a dosage of 1 capsule 3 times daily for 5 days.

Example 3

1000 cc. of a composition for parenteral administration containing 1 mg./cc. of estrone is prepared from the following types and amounts of ingredients:

| | | |
|---|---|---|
| Estrone | gm | 1 |
| Benzyl alcohol | gm | 9 |
| N,N-dimethylacetamide | cc | 50 |
| Cottonseed oil, q.s. | cc | 1000 |

The estrone and benzyl alcohol are dissolved in the N,N-dimethylacetamide. The solution is added to the cottonseed oil, filter sterilized into sterile vials, and sealed.

The composition is usefully administered intramuscularly at a dosage of 0.2 to 1 cc. once or twice a week to control menopausal symptoms.

Following the foregoing procedure, parenteral solutions are similarly prepared, increasing the amount of estrone to 2.5 gm. to provide 2.5 mg. of estrone in each cubic centimeter.

Example 4

1000 cc. of a composition for parenteral administration containing 1 mg./cc. of estrone and 10 mg./cc. of progesterone are prepared from the following types and amounts of ingredients:

| | | |
|---|---|---|
| Estrone | gm | 1 |
| Progesterone | gm | 10 |
| Benzyl alcohol | gm | 9 |
| N,N-dimethylacetamide | cc | 50 |
| Cottonseed oil, q.s. | cc | 1000 |

The estrone and progesterone are dissolved in the benzyl alcohol and N,N-dimethylacetamide. The solution is added to sufficient cottonseed oil to make 1000 cc., filter sterilized into sterile vials, and sealed.

The composition is usefully administered intramuscularly at a dosage of 1 cc. daily for 5 days for the treatment of functional amenorrhea.

Following the foregoing procedure, parenteral solutions are similarly prepared, increasing the amount of estrone to 2.5 gm. and progesterone to 25 gm. to provide 2.5 mg. of estrone and 25 mg. of progesterone in each cubic centimeter.

Example 5

1000 cc. of a composition for parenteral administration containing 0.1 mg./cc. of estrone is prepared from the following types and amounts of ingredients:

| | | |
|---|---|---|
| Estrone | gm | 0.1 |
| N,N-dimethylacetamide | cc | 1 |
| Cottonseed oil, q.s. | cc | 1000 |

The estrone is dissolved in the N,N-dimethylacetamide and added to sufficient cottonseed oil to make 1000 cc. The solution is filter sterilized into sterile vials and sealed.

The composition is usefully administered intramuscularly at a dosage of 1 cc. daily for the treatment of menopausal syndrome.

Following the foregoing procedure, parenteral solutions are similarly prepared, increasing the amount of estrone to 10 gm. and the amount of N,N-dimethylacetamide to 100 cc. to provide a composition with 10 mg. of estrone in each cubic centimeter.

The compositions prepared according to the preceding Examples 1 to 5, inclusive, are stable and the estrone will not crystallize out of solution. Further, the preparation of the compositions does not require the addition of heat as an aid to solution but can be prepared at room temperature.

What is claimed is:

1. A pharmaceutical composition for oral administration comprising estrone as an essential active ingredient, N,N-dimethylacetamide, and an edible fixed oil as a vehicle therefor.

2. The composition of claim 1 wherein the estrone is present in a concentration of from about 0.01% to about 1% and the N,N-dimethylacetamide is present in a concentration of from about 0.1% to about 10%.

3. A pharmaceutical composition for parenteral administration comprising estrone as an essential active ingredient, N,N-dimethylacetamide, and a sterile parenterally acceptable fixed oil as a vehicle therefor.

4. The composition of claim 3 wherein the estrone is present in a concentration of from about 0.01% to about 1% and the N,N-dimethylacetamide is present in a concentration of from about 0.1% to about 10%.

References Cited in the file of this patent

UNITED STATES PATENTS

| | | |
|---|---|---|
| 1,921,722 | Berendes et al. | Aug. 8, 1933 |
| 2,027,905 | Goth | Jan. 14, 1936 |
| 2,805,232 | Baade et al. | Sept. 3, 1957 |

FOREIGN PATENTS

| | | |
|---|---|---|
| 325,847 | Great Britain | Feb. 28, 1930 |
| 485,569 | Great Britain | May 17, 1938 |

OTHER REFERENCES

U.S. Dispensatory, 25th ed., 1955, pages 541–543.

Wilson et al.: "The American Drug Index" (1956), p. 499.

Wilson et al.: Ibid. (1961), page 757.

Chemical Abstracts, 1956, volume 50 (1) page 7126i–7127a, (2) page 9627b, (3) page 13829f–g, (4) page 14179b, (5) page 14834d.